Patented June 25, 1935

2,006,199

UNITED STATES PATENT OFFICE 2,006,199

PROCESS FOR THE MANUFACTURE OF RESINS BY HYDROGENATION

Stewart C. Fulton, Elizabeth, and Vladimir Kalichevsky, Woodbury, N. J., assignors to Standard-I. G. Company No Drawing. Application October 30, 1931, Serial No. 572,228

17 Claims. (Cl. 260—2)

The present invention relates to a new method for producing resins and resinous materials and more specifically to a process for converting asphaltenes into resins by the action of hydrogen. Our improved process will be fully understood from the following description of the method and of the resins so produce.

By asphaltenes we intend to indicate the class of heavy hydrocarbons, solid or semi-solid, non-crystalline, soluble in such solvents as chloroform, carbon disulfid, carbon tetrachlorid or benzol and at the same time practically insoluble in petroleum ether, a light petroleum fraction, say of a gravity of about 88° A. P. I. They are generally considered to be chiefly saturated polycyclic compounds containing a small amount of oxygen and/or sulfur.

The asphaltenes may be obtained from crude oils, heavy residua especially highly cracked and may be separated or concentrated by any suitable means, for example by distilling off the lighter oils or by precipitation, by means of liquids capable of mixing with the hydrocarbon oils but having little solvent power for asphaltic substances. Among these liquids the alcohols, for example, methyl, ethyl, propyl, butyl and amyl, either alone or mixed with each other or mixed with light hydrocarbons such as naphtha or kerosene, may be used. Light hydrocarbons may also be used, for example, mixtures of propane and ethane are suitable.

The asphaltenes are converted into resins by the action of hydrogen and they may be hydrogenated as such or as preferred in the presence of a suitable solvent. It will be understood that they need not be separated from heavy cracked oil which will act as the solvent but it is preferred to use other solvents so as to obtain greater concentrations of the asphaltic material. As solvents, we prefer to use hydrocarbons of high solvent power such as benzol, toluol, xylol; heavier coal tar oils may be used such as anthracene oil. Cyclohexene is a satisfactory solvent.

The hydrogenation treatment is relatively mild and is carried out under conditions of temperature below 400° C. or 450° C. A temperature of 350° C. has proved satisfactory and good results are obtained at temperatures as low as 250 to 325° C. High pressures are preferably employed, say above about 50 atmospheres, but pressures of 100 or 200 atmospheres or more are most satisfactory. Catalysts may also be used and are important in reducing the temperature of hydrogenation so as to obtain a satisfactory conversion of the asphaltenes to resins without vigorous destructive action (which results in formation of liquid oils) or saturation of the solvent, if an unsaturated or aromatic solvent is used for this purpose. As examples of the catalyst, molybdic, tungstic, or chromic acids may be mentioned and these may be employed alone or together or with other substances such as zinc, magnesia or alumina oxids. In general, the class of catalysts known as being immune to sulfur poisoning are the most satisfactory.

The time of contact may vary considerably depending on the temperature, the catalyst used, the extent of conversion desired and other well known factors, but in general 2 to 10 hours or more bring about conversions of 15 to 50% of the asphaltic material. It will be noted that hydrogenation conditions are adjusted to avoid marked destructive action and the temperature-pressure conditions are adjusted so that the asphaltenes are converted to resins without a substantial change in the solvent oil. Variations of temperature, pressure and time may be made to produce the best results with some particular stock.

The resins produced by our process are very soluble in aliphatic hydrocarbons, such as naphtha or kerosene, in which, the asphaltenes are almost insoluble, particularly at low temperatures. By the use of such solvents, the resins may be separated from the unconverted asphaltenes by methods disclosed in Ser. No. 572,059 filed October 30, 1931, by one of the present co-inventors. The unconverted material may be subjected to further hydrogenation treatment. The resins produced by the present method are very similar to those found in cracked residua as disclosed in the Fulton application above noted and to some extent in natural oils. The following description may be taken as typical of the product:

Melting and softening point (Ring and Ball method) 50 to 100° C.
Color—from dark brown, through a reddish brown to yellow
Odor—None
Taste—None
Insoluble in water, alcohols and acetone
Soluble in naphtha, kerosene, drying oils, esters and coal tar solvents.

These resins are unsaponifiable and the products of different melting points are suitable for replacing many natural resins, for example, in lacquers, varnishes and the like.

The following experiments may be taken as illustrating the operation of our process:

1. Asphaltic material derived from cracked tar and containing about 12% of resin is mixed with a solvent comprising cyclohexene. The liquid mixture is subject to a mild hydrogenation under pressure of 1700 pounds per square inch at 350° C. The time of treatment is about six hours and a catalyst comprising molybdic acid is used. The product after removal of the solvent by distillation was solid, contained about 35% of resin which represented a conversion of about 25% of the asphaltenes. The separated resin was of good quality and had a softening point of 56° C.

2. A similar asphaltic material is subject to a hydrogen pressure of 2000 to 2200 pounds per square inch for a period of 2¼ hours while at a temperature of 256 to 322° C. About 15% of the asphaltic material is converted into a resin which when separated from the remaining asphalt has a melting point of 78° C.

Our process may be operated in batch or continuously. A particularly convenient method is to separate natural resins from the asphaltenes and then convert the asphaltic material into resins either in a single stage or in a series of steps with or without provision for separating the resin so formed between the stage. Any convenient form of apparatus now in use for hydrogenation of oil, coal or the like is suitable for this process.

Our invention is not to be limited by any theory of the chemical action taking place, nor to any specific source for the asphaltic material, nor yet to any particular solvent or catalyst and it is desired to limit the protection only by the following claims in which it is desired to claim all novelty inherent in the invention.

We claim:

1. The process of manufacturing resins, comprising subjecting substantially oil-free asphaltenes to hydrogenation.

2. The process of manufacturing resins, comprising subjecting asphaltenes to the action of hydrogen under pressure in excess of 50 atmospheres, while at a temperature below that required to convert them largely into liquid oils, said asphaltenes having been separated from oil by precipitation.

3. The process of manufacturing resins, comprising subjecting substantially pure asphaltenes to the action of hydrogen under pressure in excess of 100 atmospheres, in the presence of a hydrogenation catalyst while at a temperature below 450° C., whereby the asphaltenes are converted to resins without substantial formation of light oils.

4. Process according to claim 3 in which the asphaltenes are treated while in the presence of a solvent.

5. Process for manufacturing resins, comprising subjecting an asphaltic-containing substance of petroleum origin to hydrogenation at pressure in excess of 100 atmospheres while at an elevated temperature insufficient for the rapid conversion to light oils, separating the resin so formed from the unconverted asphaltenes and re-subjecting the latter to hydrogenation.

6. Process of manufacturing resins from asphaltic material, which comprises separating substantially oil-free asphaltenes from said asphaltic material and then subjecting said asphaltenes to hydrogenation.

7. Process according to claim 6, in which the hydrogenation is carried out under conditions favoring the production of resins rather than oils.

8. Process according to claim 6, in which the asphaltenes are separated by extracting the asphaltic material with a solvent of the group consisting of alkyl alcohols and light petroleum hydrocarbons, thereby leaving a residue consisting chiefly of asphaltenes.

9. Process of treating asphaltic material, which comprises removing oils and resins from said asphaltic material by means of solvents in which asphaltenes are substantially insoluble, and subjecting the substantially oil-free residue to hydrogenation to produce resins.

10. Process according to claim 1, in which the asphaltenes are derived from cracked petroleum hydrocarbons.

11. Process according to claim 1, in which the asphaltenes are derived from cracked petroleum hydrocarbons, and are subjected to a hydrogen pressure of about 140 to 160 atmospheres at a temperature of from 250° C. to 350° C.

12. A resin produced by subjecting asphaltenes of petroleum origin and substantially free of oil to hydrogenation.

13. A resin produced by subjecting substantially oil-free asphaltenes to the action of hydrogen under superatmospheric pressure in the presence of a hydrogenation catalyst at a temperature below 450° C.

14. A resin produced by separating asphaltenes from asphaltic material of petroleum origin and subjecting said asphaltenes to hydrogenation.

15. A resin produced by separating asphaltenes from cracked petroleum residues and subjecting said asphaltenes to hydrogenation.

16. A resin produced by subjecting substantially oil-free asphaltenes to hydrogenation, having the following general properties: softening point above 50° C., color dark brown to yellow, odorless, tasteless, insoluble in water, alcohols and acetone and soluble in naphtha, kerosene, drying oils, esters and coal tar solvents.

17. An unsaponifiable resin produced by precipitating substantially oil-free asphaltenes from petroleum cracking coal tar, dissolving said asphaltenes in a hydrocarbon solvent hydrogenating the resulting solution at a pressure between 50 and 200 atmospheres and a temperature between 250 to 450° C. in presence of a suspended catalyst, and separating the resin from the reaction mixture.

STEWART C. FULTON.
VLADIMIR KALICHEVSKY.